April 8, 1952     M. B. SENNET     2,592,476
SERIES ARRANGEMENT OF POSITIVE
AND NONPOSITIVE SCREW PUMPS
Filed Feb. 7, 1948     2 SHEETS—SHEET 1
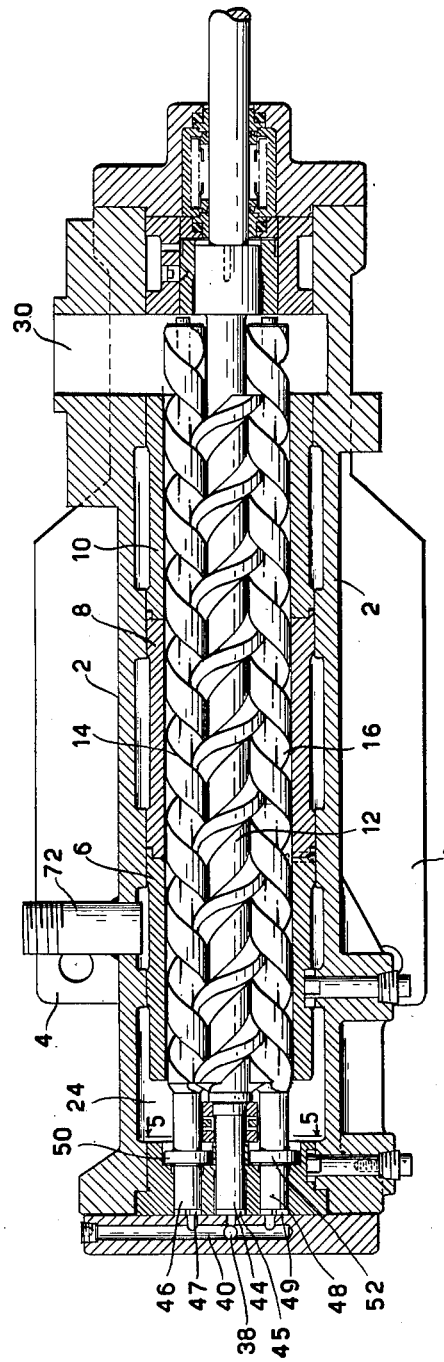
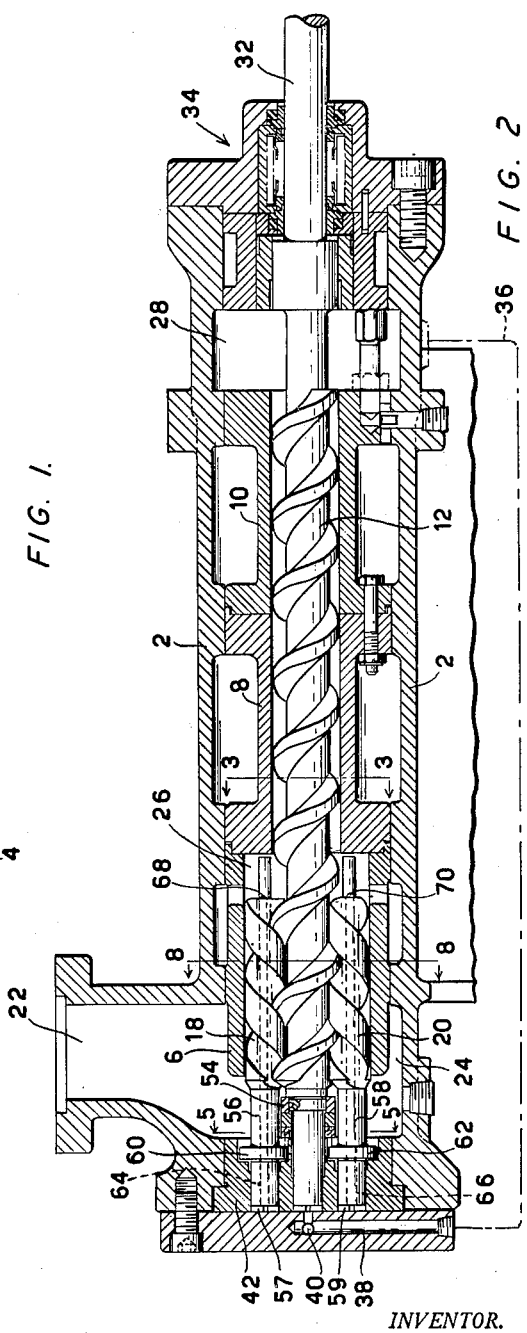
INVENTOR.
MORGAN B. SENNET
BY
ATTORNEYS

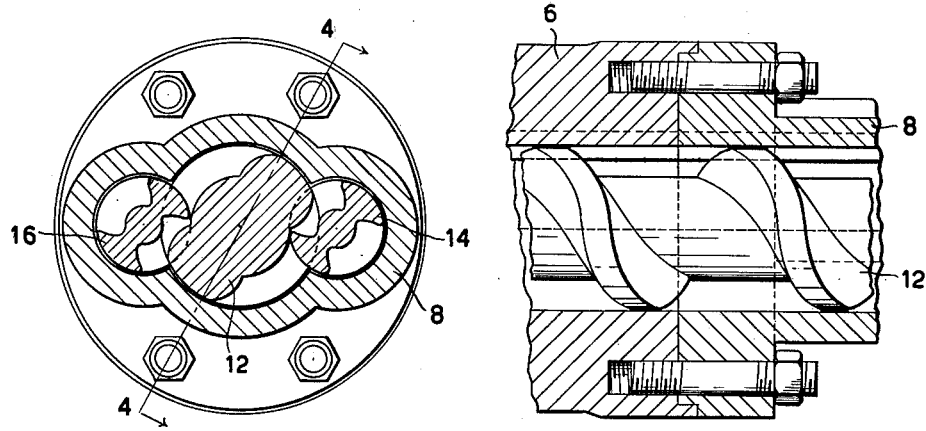
FIG. 3. FIG. 4.
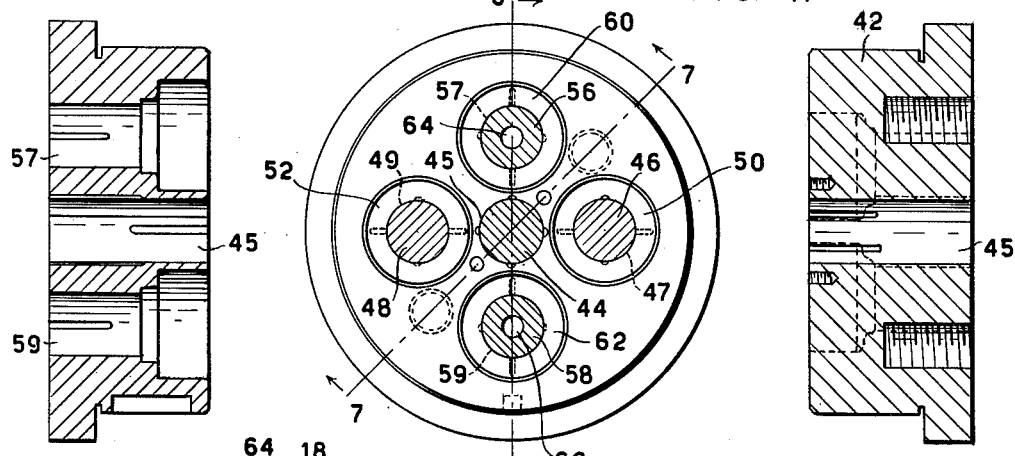
FIG. 6. FIG. 5. FIG. 7.
FIG. 8.
INVENTOR.
MORGAN B. SENNET
BY
ATTORNEYS Patented Apr. 8, 1952

2,592,476

UNITED STATES PATENT OFFICE 2,592,476

SERIES ARRANGEMENT OF POSITIVE AND
NONPOSITIVE SCREW PUMPS

Morgan B. Sennet, Trenton, N. J., assignor to
De Laval Steam Turbine Company, Trenton,
N. J., a corporation of New Jersey Application February 7, 1948, Serial No. 6,932

6 Claims. (Cl. 103—5)

1

This invention relates to multiple screw pumps and has particular reference to the provision of efficient non-positive screw pumps particularly used in conjunction with screw pumps of positive displacement type.

In the patent to Montelius 1,698,802, dated January 15, 1929, there is disclosed a type of screw pump which is positive in its displacement characteristics. In this patent there are discussed the requirements on the relationships between the numbers of threads on the intermeshing screws required for the attainment of positive displacement. A violation of these requirements would result in an inherent non-positive characteristic of a screw pump provided with intermeshing screws even though the thread shapes are generated in accordance with the principles of the patent.

Positive screw pumps of the type set forth in this patent have gone into widespread use and are capable of operating at extremely high speeds, being particularly adapted for the pumping of oil when the driving power is supplied from high speed electric motors or turbines.

While, as indicated in the patent, numerous choices of screws are possible to achieve positive displacement, particular success has been achieved commercially through the use of one power screw meshing with two idlers, each of the screws comprising two threads, the power screw having male threads of convex form while the idler screws have female threads of concave form. As will be evident this arrangement of screws will satisfy the requirements of the patent to produce positive displacement, the only deviation from absolute positive displacement existing because of the necessary small mechanical clearances of the screws with each other and the containing housing. From all practical standpoints, however, such pumps may be regarded as truly positive.

At extremely high operating speeds it will be evident that the filling of each travelling chamber must take place, as that chamber forms, in an extremely small interval of time. (It is not to be understood, however, that an intermittent approach flow of liquid is involved, since the action is such that the aggregate displacement is practically uniformly continuous.) The high rates of flow with the accompanying production of local turbulence tend to cause the setting up cavitation with accompanying substantial liquid pressure drops with the result that if a liquid such as an oil containing air and volatile constituents is pumped these may separate out in

2 gaseous and vapor form at the inlet. As soon as a closed chamber is completed by the rotation of the screws, whatever pressure existed at the inlet is essentially maintained and, accordingly, the travelling chamber may contain liquid with free vapor or gas. At the discharge this chamber is again opened, but now to the high pressure of the discharge, whereupon, if there is any free vapor, this is recompressed and probably dissolved or absorbed with resulting noise and vibration which may attain such magnitudes as to damage piping.

In my Patent 2,381,695, dated August 7, 1945, there is discussed the matter of using a booster such as a centrifugal pump to raise the pressure at the intake of the screw pump to avoid local cavitation drops which might cause the separation of vapor or gas. This patent suggests an improved solution to the problem involving the use of two positive screw pumps in successive stages preferably operating coaxially but in such fashion that the first stage does not involve such a high pressure gain as will cause it to have the unsatisfactory type of operation which has been mentioned. In this arrangement the first stage screw pump is caused to have a capacity somewhat greater than the capacity of the main second stage pump and a bleed-off arrangement is provided to carry off the excess volume delivered by the first pump which cannot be handled by the second. The securing of a greater capacity in the first pump than in the second may be attained either by providing in the first stage screws of the same pitch as in the second stage, but of greater diameter, or, preferably, providing screws of the same diameter in both stages but with the screws of the first stage having a greater pitch than those of the second stage. Even in the preferred arangement, however, it will be evident that screws of two different sets are required, complicating the matter of manufacture. The bleed-off arrangement is also essential.

In accordance with the present invention use is made of the fact that by departing from the requirements set forth in said Montelius patent non-positive pumps may be provided consistently with the maintenance of high efficiency. For example, starting with consideration of a positive pump of the type above mentioned having three screws with two threads each, the addition of two idler rotors, to provide a total of four similar idler rotors in a 4-lobed casing, will result in a non-positive pump, nevertheless of quite high efficiency. The volumetric efficiency of such a pump when operating at high speeds may be explained by the fact that even though an examination of the screw arrangement will reveal a continuous open path between inlet and outlet, nevertheless, this path is highly tortuous so that if an oil of reasonable viscosity is being pumped at high speed the forward thrusts exerted on this oil serve to propel it in the direction from inlet to outlet at a rate greatly exceeding the rate at which, under a normal pressure gradient between outlet and inlet, it would flow in reverse direction. For example, with a pump operating at 2500 R. P. M. and having a single stage, i. e., a length only slightly greater than the thread pitch, the shut-off pressure when handling oil was found to be as high as 300 pounds per square inch. At 100 pounds per square inch a capacity of 40 gallons per minute was achieved with a volumetric efficiency of 55% on the basis of 100% efficiency corresponding to the chamber displacement of the screws. The efficiency from the power absorption standpoint was also quite high.

Operation at still higher speeds revealed that this non-positive pump was not subject to the difficulties arising from cavitation existing in the case of positive screw pumps. This may be attributed to the fact that there could be no sudden transition from a low to a high pressure, the pressure gradient being distributed fairly uniformly between the inlet and outlet.

A non-positive pump of the type indicated is not self-priming and, therefore, if used alone must be submerged. However, when used as a first stage in conjunction with a positive second stage pump the latter will serve to provide priming, the combination of the two stages then having the priming characteristics of a positive pump.

Specifically in accordance with the invention it has been found advantageous to utilize a single power screw with one pair of idlers running the full effective length of the power screw. Two other idlers may operate in conjunction with the power screw adjacent to the inlet with the result that by a simple arrangement of only four screws a two stage pump may be provided having a non-positive first stage and a positive second stage. Such a pump may operate at high speeds with the advantage of light weight and a minimum of space occupied by the unit.

The foregoing will indicate the general objects of the invention. These and other specific objects relating primarily to details of construction and operation will become apparent from the following description read in conjunction with the accompanying drawings in which:

Figure 1 is a horizontal axial section showing in particular the provision of a power screw with a pair of idlers extending its full length;

Figure 2 is a vertical axial section showing in particular a pair of short idlers associated with the power screw to provide a first non-positive pumping stage;

Figure 3 is a vertical section taken on the plane indicated at 3—3 in Figure 2;

Figure 4 is a section taken on the broken surface indicated at 4—4 in Figure 3;

Figure 5 is a vertical section taken on the plane indicated at 5—5 in Figures 1 and 2;

Figure 6 is a fragmentary axial section taken on the plane indicated at 6—6 in Figure 5 and showing particularly the bearing members for the idlers;

Figure 7 is an axial section taken on the plane indicated at 7—7 in Figure 5; and Figure 8 is a vertical section taken on the plane indicated at 8—8 in Figure 2.

The term "positive screw pump" as used herein refers to a pump of the character described in the above-mentioned Montelius Patent No. 1,698,802. As in the case of any positive pump, there must be clearances for running and these clearances inherently involve leakage. Actually, the leakage is very low and, for all practical purposes, under any normal running conditions, the throughput of the pump is practically its theoretical displacement. A positive pump of this type will be such that no theoretical leakage would occur, assuming perfect fitting of the parts. The lengths of the screws, of course, which are shrouded, must be sufficient to provide at all times a closure, i. e. a theoretical barrier against flow, disregarding as before leakage due to clearances only.

In contrast with a positive screw pump such as just described, a non-positive screw pump is one in which, aside from leakages due to clearance, there is a free passage, though tortuous, between its outlet and inlet irrespective of the shrouded lengths of the screws. The tortuous path produced involves the imposition of substantial friction during operation on the liquid and, consequently, pumping will occur. However, if the pump is stopped, a quite free flow takes place which is not merely a flow of leakage through improperly fitting parts. Such a non-positive pump may be secured by deviation from the criteria given in said Montelius patent, and, in fact, given a particular positive pump corresponding to the criteria of the patent, a non-positive pump may be readily derived therefrom either by adding or subtracting an idler screw.

The pump housing is indicated generally at 2 and is provided with a suitable axial bore for the reception of a series of casings indicated at 6, 8 and 10 provided with axially extending bores for the reception of the intermeshing screws. The casing 6, as more particularly illustrated in Figure 8, has a 4-lobed bore for the reception of a power screw and four idlers. The casings 8 and 10, on the other hand, are provided with 2-lobed bores for reception of the power screw and the long idlers. In accordance with the usual practice in the construction of screw pumps the screws fit these bores with only the very small clearances required for free running, these clearances being exaggerated in the sectional figures.

The power screw 12 is of the usual type having convex-faced threads, there being two threads on this screw. Each of the long idlers 14 and 16 is provided with two threads of concave form. The forms of these threads are well known and require no special comment, the thread shapes being generated in accordance with the principles described in said Montelius patent. Throughout the extent of the casings 8 and 10 the three screws so far mentioned provide a positive pump through which leakage can occur only to the extent permitted by the necessary running clearances between the screws and between the screws and the casings. For all practical purpose, there is provided a pump which is truly positive and capable of pumping liquid against very large heads.

Within the casing 6 there are associated with the power rotor 12 two idlers 18 and 20 in addition to the idlers 14 and 16. Within the length of this casing 6, which is at least of a length equal to the pitch of the screws, there is provided a non-positive pump having, however, good efficiency characteristics as described above. The short idlers 18 and 20 have precisely the same thread shapes as the long idlers. The length of the casings 8 and 10 is at least in excess of the pitch of the screws and is preferably several times the pitch length. This condition is generally adopted where pumping is to be effected against extremely high heads.

Due to the presence of the two extra short idler rotors the non-positive pump would have a theoretical displacement of the order of 30% greater than that of the positive pump. Accordingly, it is capable of supplying theoretically to the positive pump an excess of liquid.

The intake to the non-positive pump is indicated at 22, the intake chamber being that illustrated at 24, communicating with the inlet ends of the five screws. A chamber 26 in the right-hand portion of the casing 6 constitutes the outlet chamber for the non-positive pump and the inlet chamber for the positive pump. Delivery of the positive pump is into the chamber 28 provided with the delivery outlet 30. The driving shaft is indicated at 32 and passes through a stuffing box and bearing arrangement indicated at 34 which is conventional and need not be described in detail. As is usual in these screw pumps there is no need for gearing between the power rotor and the idler rotors which are smoothly and properly driven by the action of the power rotor, the cross sections of the screws being designed in the general form of cycloidal gear teeth. As is also usual, the construction and arrangement of the screws is preferably such that at most a minor mechanical transmission of power for rotation is imparted by the power rotor to the idler or idlers, the latter being to a major extent driven by the liquid.

Important in a high pressure screw pump is the matter of taking care of end thrusts of the screws. The right-hand ends of the power rotor 12 and of the idlers 14 and 16 are subjected to the high pressure of the delivered liquid and, consequently, this thrust should be balanced at the left-hand ends of these screws. This condition is taken care of by bleeding the pump liquid, which is usually an oil having lubricating properties, through a connection indicated at 36 from the delivery chamber 28 to a pair of intersecting bores 38 and 40 in the left-hand end plate of the housing. From these bores there are axial extensions communicating with bores 45, 47 and 49 in the left-hand bearing member 42. Extending into these bores are the shaft ends 44 of the power screw and the shaft ends 46 and 48 of the idler screws 14 and 16.

A thrust bearing 54 is provided for the power screw while collars 50 and 52 provide thrust bearings for the idlers 14 and 16. Oil distribution grooves are provided in the bores as indicated particularly in Figures 5, 6 and 7 to insure positive lubrication of both the cylindrical bearing surfaces and the radial thrust surfaces. As will be evident, this arrangement provides to the left-hand shaft extension 46 and 48 of the idlers 14 and 16 and to the shaft extension 44 of the power rotor 12 oil at the outlet pressure, this also being applied to the enlarged cross-sectional areas afforded by the collars 50 and 54, thus serving to balance the screws just mentioned for end thrusts.

In the case of the idlers 18 and 20, however, the left-hand thrust is due to an intermediate pressure between the inlet and outlet pressures existing in the chamber 26. In order to provide balancing of these screws they are provided with bores 64 and 66 extending through them and their shaft extensions 56 and 58, these bores communicating through lateral openings 68 and 70 with the liquid in the chamber 26. The bores 57 and 59 in the member 42 which receive the shaft extensions 56 and 58 are closed at their left-hand ends and provided with oil distributing grooves. As in the case of the other idlers, the idlers 18 and 20 are provided with thrust collars 60 and 62 to the left-hand surfaces of which the balancing oil pressure is admitted. The resulting arrangement serves to balance the idlers 18 and 20 against the pressure existing in the intermediate chamber 26.

While generally unnecessary, the chamber 26 is provided with an outlet 72 which may provide for the bleeding-off of liquid from this chamber through an adjustable valve arranged to maintain a predetermined pressure in this chamber as indicated in my Patent 2,381,695 referred to above. The non-positive nature of the pump comprising the four idlers, however, usually makes necessity for control at this point unnecessary.

The foregoing description will have indicated generally the characteristics of operations of the pump which has been described. The liquid enters the non-positive pump through the inlet connection 22 and is subjected to a pressure rise therein so that the non-positive pump serves to feed the positive pump under pressure. The displacement of the non-positive pump is theoretically greater than that of the positive pump but even though no liquid is bled-off at 72 this does not occasion any jamming due to the fact that the first stage pump is non-positive. It will, accordingly, only deliver the quantity which corresponds to the displacement of the positive pump with a pressure gain in it corresponding to this displacement. The fact that the first stage is non-positive prevents, for the reasons indicated above, cavitation troubles and consequent vibratory and noisy operation. Since the positive pump receives liquid under a high pressure no cavitational effects appear at the inlet to this pump and the entire unit is capable of running quietly at extremely high speeds.

It will, of course, be evident that while structure and operation are very much simplified by an arrangement as shown the invention also includes the possibility of arranging a non-positive screw pump in series with a second stage positive screw pump even though the two may not be in axial alignment. Furthermore, it is not required that the screws in the non-positive portion of the pump should be of the same pitch as those in the positive portion but a difference in pitch may exist as in the case of the pair of positive pumps described in my Patent 2,381,695. The first stage pump may also be made non-positive, even though it has the same number of screws as the second stage, by having such numbers of threads on its rotors as do not conform to the requirements given in Montelius Patent 1,698,802.

It is also to be understood that the invention is not limited to the particular screw arrangements which are illustrated. The positive pump, for example, may comprise only two screws with the power screw having a single thread and the idler having two threads. In such case the non-positive pump could be provided by having a second 2-thread idler intermeshing with the power screw through only a portion of its length adjacent to the inlet. It will be evident that, in general, the positive screw pump may be constructed to conform with the requirements set forth in said Montelius patent while the non-positive pump may be provided by deviation from these requirements, generally in the direction of addition of one or more idlers in order to secure for the non-positive pump a greater theoretical displacement than that of the positive pump. It may be specifically pointed out that a single idler such as 18 could be used in place of the pair of idlers 18 and 20 in the specific construction illustrated to provide a non-positive first stage. However, to insure proper transverse balance under high speed and high pressure conditions it is desirable to maintain symmetry and hence the provision of the four idlers having 90° spacing from each other as indicated in Figure 8.

What I claim and desire to protect by Letters Patent is:

1. In combination, a positive multiple screw pump, and a non-positive multiple screw pump having at least one screw in common with the positive pump, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure.

2. In combination, a positive multiple screw pump, and a non-positive multiple screw pump having a plurality of screws in common with the positive pump, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure.

3. In combination, a positive multiple screw pump, and a non-positive multiple screw pump comprising extensions of the screws of the positive pump and at least one additional screw to render it non-positive, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure.

4. In combination, a positive multiple screw pump comprising a power screw and a pair of idler screws intermeshing therewith, each of the screws having two threads, and a non-positive multiple screw pump comprising extensions of said three screws of the positive pump and at least one additional idler screw to render it non-positive, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure.

5. In combination, a positive multiple screw pump comprising a power screw and a pair of idler screws intermeshing therewith, each of the screws having two threads, and a non-positive multiple screw pump comprising extensions of said three screws of the positive pump and an additional pair of idler screws to render it non-positive, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure.

6. In combination, a positive multiple screw pump, a non-positive multiple screw pump having a plurality of screws in common with the positive pump and at least one additional screw to render it non-positive, said pumps being staged with the non-positive pump delivering its output to the positive pump, the non-positive pump having a theoretical delivery in excess of that of the positive pump and thereby serving to provide at the inlet of the positive pump a pressure higher than its own inlet pressure, thrust bearings for all of said screws, means connecting the outlet of the positive pump to the thrust bearings of the screws embodied in the positive pump to provide balancing pressure therefor, and means connecting the outlet of the non-positive pump to the thrust bearing for the additional screw of the non-positive pump to provide balancing pressure therefor.

MORGAN B. SENNET.

REFERENCES CITED

The following references are of record in the file of this patent:

UNITED STATES PATENTS

| Number | Name | Date |
|---|---|---|
| 132,891 | Bailey | Nov. 12, 1872 |
| 1,317,370 | Holdaway | Sept. 30, 1919 |
| 1,698,802 | Montelius | Jan. 15, 1929 |
| 1,927,799 | Mann | Sept. 19, 1933 |
| 2,027,015 | Bell | Jan. 7, 1936 |
| 2,055,587 | Pigott | Sept. 29, 1936 |
| 2,358,721 | Djungdahl | Sept. 19, 1944 |
| 2,358,815 | Lysholm | Sept. 26, 1944 |
| 2,369,539 | Delamere | Feb. 13, 1945 |
| 2,381,695 | Sennet | Aug. 7, 1945 |

FOREIGN PATENTS

| Number | Country | Date |
|---|---|---|
| 62,290 | Denmark | May 30, 1944 |
| 85,331 | Sweden | Nov. 21, 1935 |
| 453,415 | Great Britain | Sept. 10, 1936 |
| 453,727 | Germany | Dec. 1, 1927 |